(12) United States Patent
Song et al.

(10) Patent No.: US 12,342,216 B1
(45) Date of Patent: Jun. 24, 2025

(54) DATA TRANSMISSION METHOD AND ACCESS POINT

(71) Applicant: TP-Link Systems Inc., Irvine, CA (US)

(72) Inventors: Junju Song, Shanghai (CN); Ziyu Wang, Shanghai (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/805,501

(22) Filed: Aug. 14, 2024

(51) Int. Cl.
*H04W 28/02* (2009.01)

(52) U.S. Cl.
CPC .............................. *H04W 28/0268* (2013.01)

(58) Field of Classification Search
CPC ................................................ H04W 28/0268
See application file for complete search history.

(56) References Cited

U.S. PATENT DOCUMENTS

| 11,683,242 | B2 | 6/2023 | Sarangam |
| 2007/0121542 | A1 | 5/2007 | Lohr |
| 2021/0099907 | A1* | 4/2021 | Mahamkali ....... H04W 28/0268 |

FOREIGN PATENT DOCUMENTS

| CN | 103117952 A | 5/2013 |
| EP | 1317102 A1 | 6/2003 |

* cited by examiner

*Primary Examiner* — Ayanah S George
(74) *Attorney, Agent, or Firm* — Loeb & Loeb LLP

(57) ABSTRACT

The present disclosure provides a method for data transmission and an access point (AP) for performing this method. The method includes receiving, by a hardware receiving port and a software receiving port, a first set of data packets and a second set of data packets, respectively; performing, by a hardware pre-processing module and a software pre-processing module, QoS related pre-processing on the first set of data packets and the second set of data packets, respectively; forwarding the pre-processed first set of data packets and the pre-processed second set of data packets to a selected QoS module, wherein the selected QoS module is one of a hardware QoS module and a software QoS module; and for each pre-processed data packet of the pre-processed first set of data packets and the pre-processed second set of data packets, performing, by the selected QoS module, QoS processing on the pre-processed data packet.

20 Claims, 10 Drawing Sheets

| Hardware QoS traffic mark | Software QoS traffic mark |
|---|---|
| H1 | S1 |
| H2 | S2 |
| ... | |
| HN | SN |

Fig. 5

DATA TRANSMISSION METHOD AND ACCESS POINT

TECHNICAL FIELD

The present disclosure relates to wireless communication, and more specifically, to a method for data transmission and an access point performing this method.

BACKGROUND

Quality of Service (QoS) processing plays a critical role in data transmission through an access point (AP), which can improve the overall network performance and the user experience by ensuring that the quality of the transmission of different types of data packets meets the different requirements of an application. In general, QoS processing relates to traffic control such as speed limiting, resource scheduling and bandwidth allocation on the data packet to be transmitted.

Currently, an AP can implement QoS processing through a hardware QoS path or a software QoS path. However, the hardware QoS path allows a limited number of data packets to pass through. The data packets that cannot enter the hardware QoS path are redirected to the software QoS path. This causes the data packets to be divided into two parts and the two parts are subjected to traffic control independently, resulting in low accuracy of the QoS processing. The software QoS path primarily depends on the Central Processing Unit (CPU) resources of the AP, which may result in insufficient CPU resources available for other AP operations, leading to degraded performance of the AP.

SUMMARY

In view of the above problems, the present disclosure provides techniques for data transmission through the AP that can improve the accuracy of the QoS processing while preventing too many CPU resources from being occupied by the QoS related processing.

According to an aspect of the present disclosure, there is provided a method for data transmission performed by an access point, comprising: receiving, by a hardware receiving port and a software receiving port, a first set of data packets and a second set of data packets, respectively; performing, by a hardware pre-processing module and a software pre-processing module, QoS related pre-processing on the first set of data packets and the second set of data packets, respectively; forwarding the pre-processed first set of data packets and the pre-processed second set of data packets to a selected QoS module, wherein the selected QoS module is one of a hardware QoS module and a software QoS module; and for each pre-processed data packet of the pre-processed first set of data packets and the pre-processed second set of data packets, performing, by the selected QoS module, QoS processing on the pre-processed data packet.

According to an aspect of the present disclosure, there is provided an access point (AP) comprising: a hardware receiving port, configured for receiving a first set of data packets; a software receiving port, configured for receiving a second set of data packets; a hardware pre-processing module, configured for performing QoS related pre-processing on the first set of data packets and forwarding the pre-processed first set of data packets to a selected QoS module; a software pre-processing module, configured for performing QoS related pre-processing on the second set of data packets and forwarding the pre-processed second set of data packets to the selected QoS module; wherein the selected QoS module is one of a hardware QoS module and a software QoS module of the AP, and wherein, for each pre-processed data packet of the pre-processed first set of data packets and the pre-processed second set of data packets, the selected QoS module is configured for performing QoS processing on the pre-processed data packet.

According to yet another aspect of the present disclosure, there is provided a computer program product, A computer program product, including computer-readable medium storing instructions thereon, when executed by a processor of an access point (AP) causes the processor to perform operations of: controlling reception of a first set of data packets and a second set of data packets by a hardware receiving port and a software receiving port of the AP, respectively; controlling performance of Quality of Service (QoS) related pre-processing on the first set of data packets and the second set of data packets by a hardware pre-processing module and a software pre-processing module of the AP, respectively; controlling forwarding of the pre-processed first set of data packets and the pre-processed second set of data packets to a selected QoS module of the AP, wherein the selected QoS module is one of a hardware QoS module and a software QoS module of the AP; and for each pre-processed data packet of the pre-processed first set of data packets and the pre-processed second set of data packets, controlling performance of QoS processing on the pre-processed data packet by the selected QoS module.

At least based on the above embodiments of this disclosure, both the data packets received via the hardware receiving port and the data packets received via the software receiving port are routed into the selected one of the hardware QoS module and the software QoS module for QoS processing. In this way, the data packets may not be divided into two parts and instead be aggregated into the same QoS module to be subjected to traffic control together. This can improve the accuracy of QoS processing. Furthermore, the tasks associated with the receiving and pre-processing of the data packets are undertaken by both the hardware QoS path and the software QoS path, which prevents the CPU resources from being excessively consumed by the software QoS path.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure but do not constitute a limitation on the present disclosure. In the drawings, unless otherwise explicitly indicated, the same reference numerals refer to the same components, steps or elements.

FIG. 5 is a diagram illustrating an exemplary mapping table according to an embodiment of the present disclosure;

DETAILED DESCRIPTION

Figure 1:
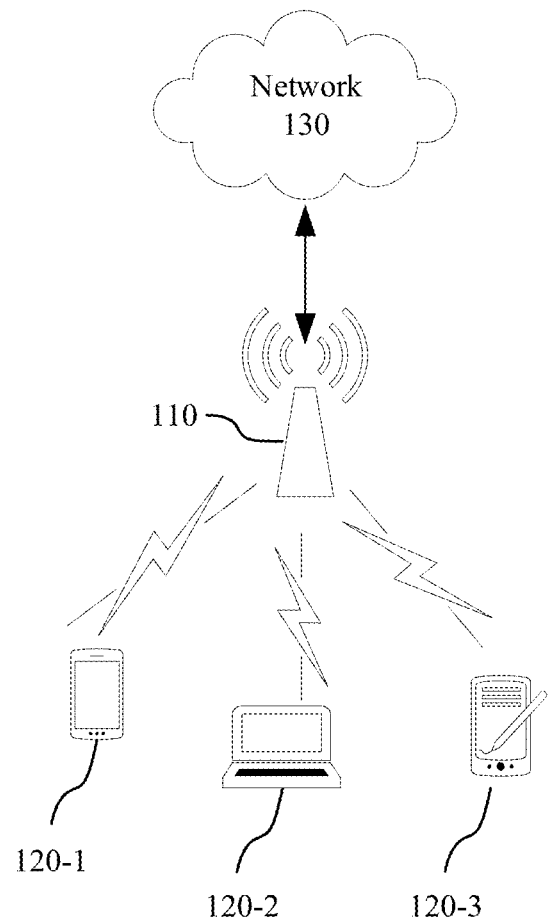
FIG. 1 is a diagram illustrating an exemplary application scenario of the AP according to an embodiment of the present disclosure.

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined as long as no conflicts occur therebetween.

Some of the drawings may not depict all the components of a given method, device and system. Like reference numerals may be used to denote like features throughout the specification and drawings.

FIG. 1 is a diagram illustrating an exemplary application scenario of the AP according to an embodiment of the present disclosure.

Referring to FIG. 1, AP 110 may wirelessly communicate with the client devices (also referred to as stations or STAs) 120-1 through 120-3 over a wireless channel. STAs 120-1, 120-2 and 120-3 may be mobile phones, wearable communication devices, laptop computers, desktop computers, tablet computers, personal Digital Assistants (PDAs), or the like. AP 110 may access network 103 over a wired channel, such as a fiber. AP 110 thereby provides network access to the STAs 120-1, 120-2 and 120-3. In the uplink direction, AP 110 may receive various data packets from one or more of the STAs 120-1, 120-2 and 120-3 and relay them to network 130. In the downlink direction, AP 110 may receive various data packets from network 130 and relay them to one or more of STAs 120-1, 120-2 and 120-3. In order to ensure the quality of the data transmission of different types of data packets to meet the different requirements of an application, AP 110 may perform QoS processing, including operations associated with traffic control, on the data packets before relaying them to STAs 120-1, 120-2 and 120-3 or network 130.

Figure 2:
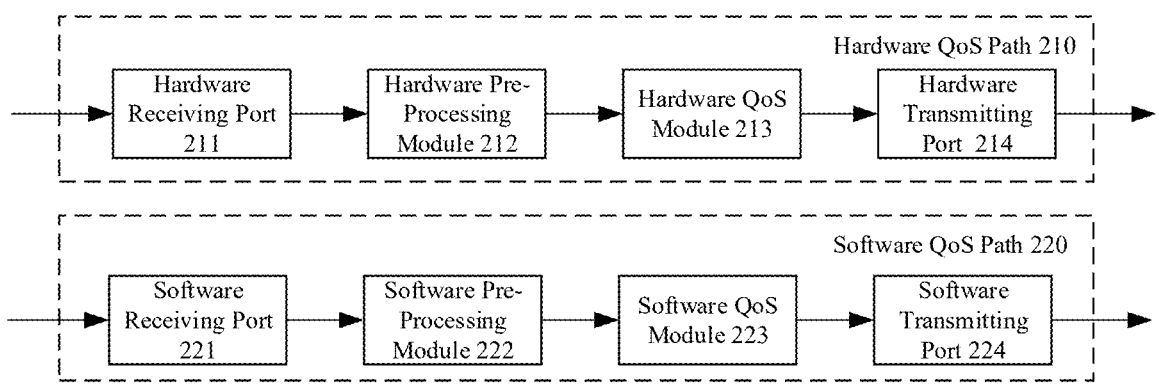
FIG. 2 is a diagram illustrating an exemplary architecture for data transmission according to prior art.

FIG. 2 is a diagram illustrating an exemplary architecture for data transmission according to prior art.

Referring to FIG. 2, AP 110 may relay data packets through hardware QoS path 210 and software QoS path 220. The hardware QoS path 210 may include hardware receiving port 211, hardware pre-processing module 212, hardware QoS module 213 and hardware transmitting port 214. The software QoS path 220 may include software receiving port 221, software pre-processing module 222, software QoS module 223 and software transmitting port 224. As previously mentioned, the hardware QoS path 210 allows a limited number of data packets to pass through and thus the data packets that cannot enter the hardware QoS path 210 are redirected to the software QoS path 220. This causes the data packets to be divided into two parts which may be independently subjected to the QoS processing in two different QoS modules, resulting in low accuracy of the QoS processing.

Some efforts have been made to better implement data transmission with QoS processing. For example, an attempt has been made to disable the hardware QoS path 210 so that all the data packets pass through the software QoS path 220 to achieve higher accuracy of QoS processing, but this undoubtedly increases the CPU overhead associated with the software QoS path 220 and thus may degrade the performance of AP 110. What's worse, the inaccuracy caused by splitting the data packets into two parts may sometimes be directly ignored. In short, current implementations of data transmission with QoS processing cannot simultaneously guarantee the performance of AP 110 and the accuracy of the QoS processing in complex scenarios.

In view of this, the present disclosure proposes to perform data transmission related to QoS processing based on the cooperation between the hardware QoS path 210 and the software QoS path 220. In this way, the accuracy of QoS processing can be improved, while the overhead of the CPU resources involved in QoS processing can be reduced.

Figure 3A:
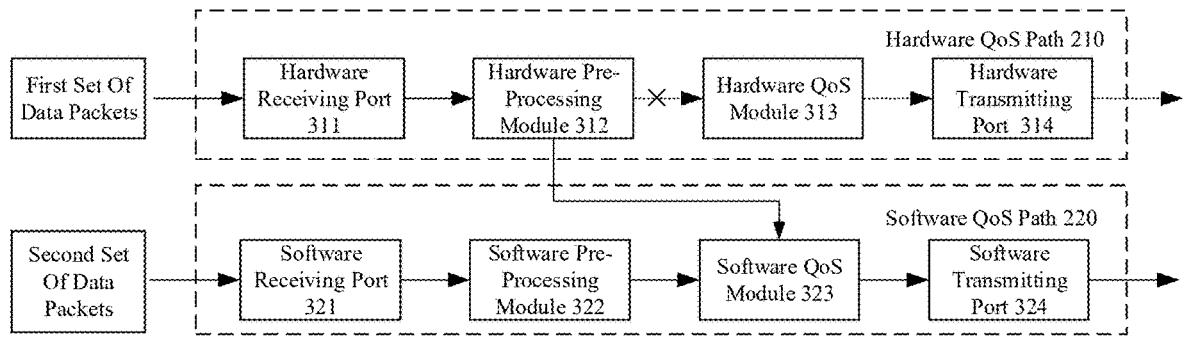
FIG. 3A is a diagram illustrating an exemplary architecture for data transmission according to an embodiment of the present disclosure.
Figure 3B:
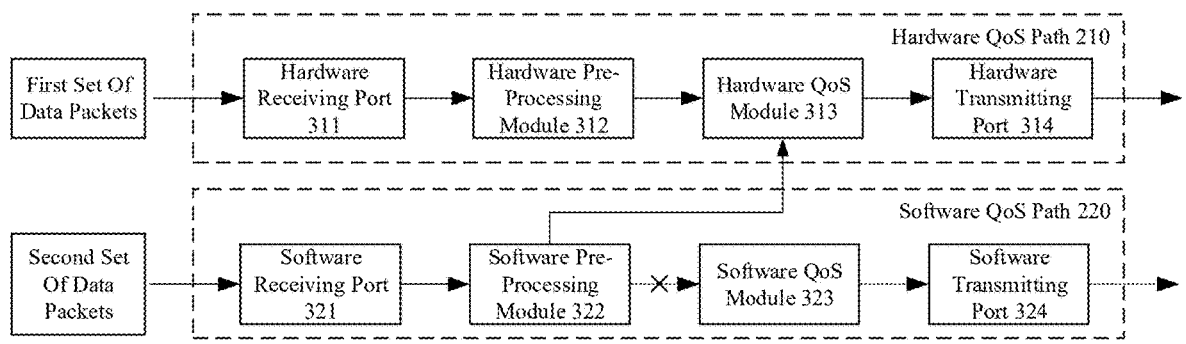
FIG. 3B is a diagram illustrating another exemplary architecture for data transmission according to an embodiment of the present disclosure.

FIG. 3A is a diagram illustrating an exemplary architecture for data transmission according to an embodiment of the present disclosure. FIG. 3B is a diagram illustrating another exemplary architecture for data transmission according to an embodiment of the present disclosure.

Referring FIGS. 3A and 3B, AP 110 according to an embodiment of the present disclosure may include a hardware receiving port 311, a hardware pre-processing module 312, a hardware QoS module 313 and a hardware transmitting port 314, a software receiving port 321, a software pre-processing module 322, a software QoS module 323 and a software transmitting port 324.

The hardware receiving port 311 may refer to a physical interface in AP 110 that may receive an uplink data packet from one or more of STAs 120-1, 120-2, and 120-3 or that may receive a downlink data packet from network 130. For example, the hardware receiving port 311 may be a Local Area Network (LAN) port in the uplink direction or Wide Area Network (WAN) port in the downlink direction. The hardware receiving port 311 may be implemented as Network Interface Card (NIC), Interface Chip, etc. The software receiving port 321 may refer to a virtual interface in AP 110 that may receive an uplink data packet from one or more of STAs 120-1, 120-2, and 120-3 or that may receive a downlink data packet from network 130. For example, the software receiving port 321 may be embodied within the kernel of the OS (Operating System) of AP 110. The hardware pre-processing module 312 may refer to a hardware module in AP 110 that is used for performing QoS related pre-processing on the data packets received via hardware receiving port 311, such as a hardware Network Address Translation ((NAT) module used for converting a private IP address of the received data packets to a public IP address, a hardware firewall used for checking and filtering the received data packets to ensure that only the data packets that meet predefined rules are allowed to pass through, etc. The software pre-processing module 322 may refer to a software module in AP 110 that is used for performing QoS related pre-processing on the data packets received via software receiving port 311, such as a software NAT module used for converting a private IP address of the received data packets to a public IP address, a software firewall used for checking and filtering the received data packets to ensure that only the data packets that meet predefined rules are allowed to pass through, etc. The hardware QoS module 313 may refer to a part of a physical chip such as an application-specific integrated circuit (ASIC) on the motherboard of AP 110 or a programmable processor dedicated to AP 110. The software QoS module 323 may be embodied within the kernel of the OS of AP 110. The hardware transmitting port 314 may refer to a physical interface in AP 110 that may transmit an uplink data packet to network 130 or that may transmit a downlink data packet to one or more of STAs 120-1, 120-2, and 120-3. For example, the hardware transmitting port 314 may be a Wide Area Network (WAN) port in the uplink direction or a Local Area Network (LAN) port in the downlink direction. The hardware transmitting port 314 may be implemented as a Network Interface Card (NIC), Interface Chip, etc. The software transmitting port 324 may refer to a virtual interface in AP 110 that may transmit an uplink data packet to network 130 or that may transmit a downlink data packet to one or more of STAs 120-1, 120-2, and 120-3. For example, the software transmitting port 324 may be embodied within the kernel of the OS of AP 110.

As shown in FIGS. 3A and 3B, the hardware receiving port 311 may be configured for receiving a first set of data packets. The software receiving port 321 may be configured for receiving a second set of data packets. Each of the first set of data packets and the second set of data packets may include one or more data packets. The hardware pre-processing module 312 may be configured for performing QoS related pre-processing on each data packet of the first set of data packets and transmitting the pre-processed first set of data packets to a selected QoS module. The software pre-processing module 322 is configured for performing QoS related pre-processing on each data packet of the second set of data packets and transmitting the pre-processed second set of data packets to the selected QoS module. The pre-processing of each data packet includes, for example, converting the private IP address of the data packet to a public IP address, detecting whether the data packet is allowed to pass through the firewall according to a predefined rule, and other processing related to the subsequent QoS processing. The pre-processing on the second set of data packets is similar to that on the first set of data packets. In this way, the pre-processed first set of data packets and the pre-processed second set of data packets can be aggregated into the selected QoS module. The selected QoS module is one of the hardware QoS module 313 and the software QoS module 323 of AP 110. Specifically, the selected QoS module is the software QoS module 323 in the example shown in FIG. 3A and the hardware pre-processing module 312 may forward the pre-processed first set of data packets to the software QoS module 323. The selected QoS module is the hardware QoS module 313 in the example shown in FIG. 3B and the software pre-processing module 322 may forward the pre-processed second set of data packets to the hardware QoS module 313. The selected QoS module may be further configured, for each data packet of the pre-processed first set of data packets and the pre-processed second set of data packets, to perform QoS processing on the pre-processed data packet.

According to an embodiment of the present application, the selected QoS module may be selected based on the utilization of the CPU of AP 110. For example, the software QoS module may be selected as the selected QoS module when the utilization of the CPU is less than a threshold (for example, 70%, 80%, or other value), while the hardware QoS module may be selected as the selected QoS module when the utilization of the CPU is greater than the threshold.

As such, AP 110 according to an embodiment of the present disclosure uses both the hardware receiving port 311 and the software receiving port 321 to receive data packets to be relayed, uses both the hardware pre-processing module 312 and the software pre-processing module 322 to pre-process the data packets to be relayed and uses one of the hardware QoS module 313 and software QoS module 323 to perform the QoS processing on the data packets. In this way, the pre-processed first set of data packets and the pre-processed second data packet are aggregated into one of the hardware QoS module 313 or the software QoS module 323. This enables the pre-processed first set of data packets and the pre-processed second set of data packets to be QoS processed together instead of separately, while the first set of data packets and the second data packet still be received and pre-processed separately. Compared to the prior art of disabling the hardware path 210 to have all data packets pass through the software QoS path 220 or of splitting the data packets into two parts that then pass through the hardware path 210 and the software path 220, respectively, AP 110 according to an embodiment of the present disclosure reduces the overhead of the CPU resources of the AP 110 and improves the accuracy of the QoS processing.

After being QoS-processed in the selected QoS module, the QoS-processed first set of data packets and the QoS-processed second set of data packets may be transmitted by the selected one of the hardware transmitting port 314 and the software transmitting port 324 corresponding to the selected QoS module.

In the example shown in FIG. 3A, the selected QoS module is the software QoS module 323 and the transmitting port corresponding to the software QoS module 323 is the software transmitting port 324. In this case, the QoS-processed first set of data packets and the QoS-processed second set of data packets are transmitted by the software transmitting port 324. In the example shown in FIG. 3B, the selected QoS module is the hardware QoS module 313 and the transmitting port corresponding to the hardware QoS module 313 is the hardware transmitting port 314. In this case, the QoS-processed first set of data packets and the QoS-processed second set of data packets are transmitted by the hardware transmitting port 314.

Thus, by transmitting both the first and second sets of data packets via the same transmitting port, the overall efficiency of data transmission can be improved. If the first and second sets of data packets are to be transmitted by the hardware data packet and the software data packet, respectively, it is necessary to distribute the QoS-processed first and second sets of data packets to the two transmitting ports. In this case, it will inevitably increase the overall delay and reduce the overall real-time performance and overall response speed of the data transmission.

According to an embodiment of the present disclosure, the selected QoS module (i.e., the hardware QoS module 313 or the software QoS module 323) may be further configured to perform QoS processing on the pre-processed data packet based on the type of the pre-processed data packet meeting a predetermined condition.

In the example shown in FIG. 3A, the selected QoS module is the software QoS module 323. The software QoS module 323 may determine, for each data packet of the pre-processed first set of data packets and the pre-processed second set of data packets, whether to perform QoS processing on the pre-processed data packet based on the type of the pre-processed data packet meeting a predetermined condition.

In an embodiment, the predetermined condition comprises that the pre-processed data packet is not a control-type data packet. A control-type data packet may include an acknowledgment (ACK) packet, a keep-Alive packet, a WebSocket Ping/Pong packet, and other types of data packets used to maintain the connection with the STAs 120-1, 120-2 and 120-3 and the network 130 or to ensure the stability of the connection, etc. In the embodiment, the software QoS module 323 directly releases the control-type data packets, i.e., the software QoS module 323 does not perform QoS processing on the control-type data packets.

The release of the control-type data packets is advantageous. As known, a control-type data packet usually needs to be transmitted in a timely manner. For example, if an ACK packet as a control-type data packet, gets stuck in the software QoS module 323 due to the QoS processing to be performed on it, the receiving party of the ACK packet may not receive the ACK packet within the expected time, which eventually leads to data retransmission and the decrease of throughput.

As such, AP 110 according to an embodiment of the present can ensure that the control-type data packets are transmitted in a timely manner by releasing control-type data packets and not performing QoS processing on the control-type data packets.

Similar to the software QoS module 323, when the selected QoS module is the hardware QoS module 313 as shown in FIG. 3B, the hardware QoS module 313 can also directly release the control-type data packets and does not perform QoS processing on them.

Figure 4:
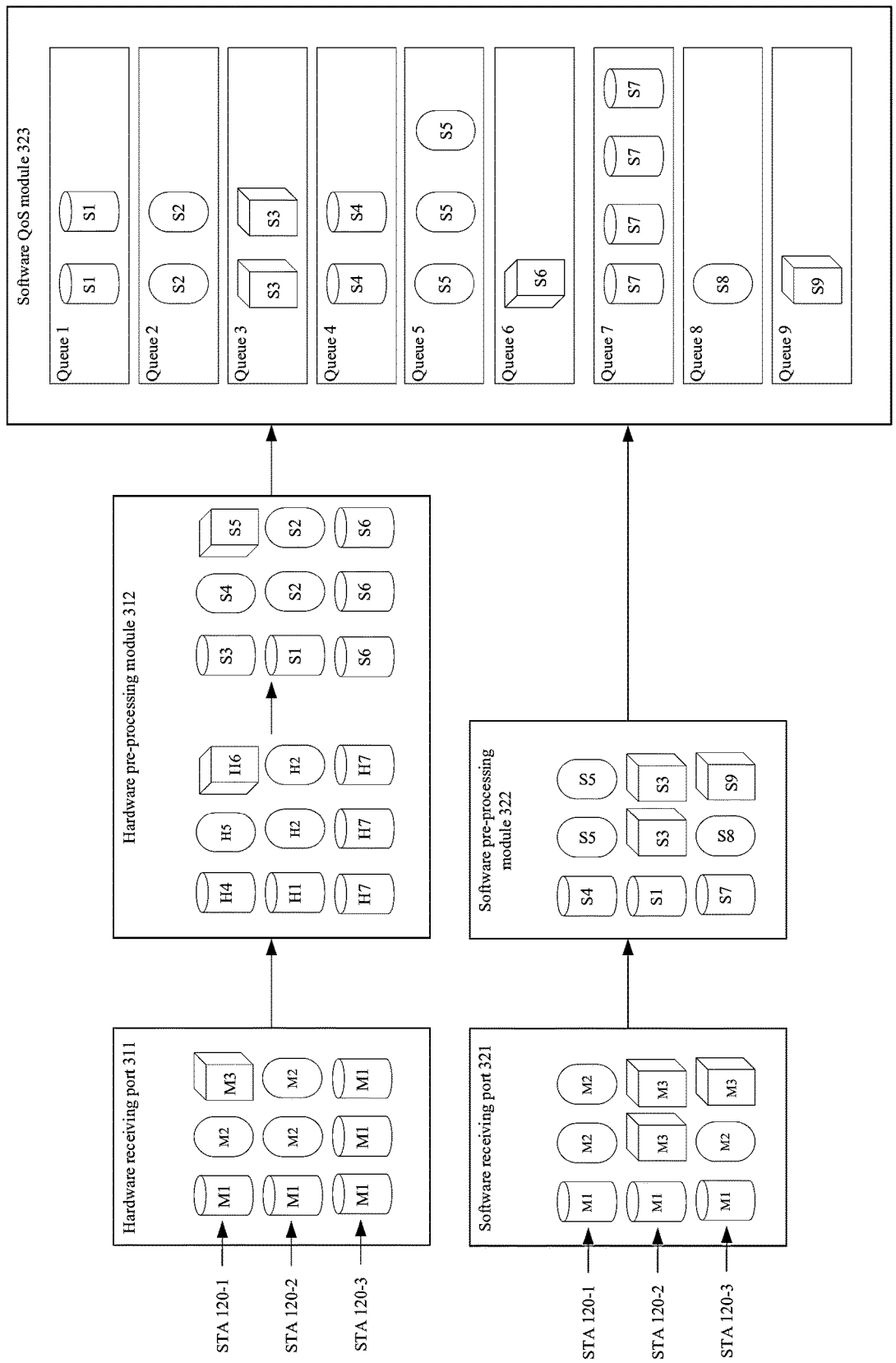
FIG. 4 is a diagram illustrating an exemplary processing flow of data packets according to an embodiment of the present disclosure.

FIG. 4 is a diagram illustrating an exemplary processing flow of data packets according to an embodiment of the present disclosure.

Referring to FIG. 4, the hardware receiving port 311 receives the first set of data packets from the STA 120-1, 120-2 and 120-3. The first set of data packets includes a total of nine data packets including one video data packet (shown as a cylinder in FIG. 4), one image data packet (shown as rectangles with rounded corners in FIG. 4) and one text data packet (shown as rectangles with rounded corners FIG. 4) received from STA 120-1, one video data packet and two image data packets received from STA 120-2, and three video data packets received from STA 120-3. As shown in FIG. 4, each of the first set of data packets has an original traffic mark given by the corresponding STA. For example, the original traffic mark of the video data packet "M1". The original traffic mark of the image data packet is "M2". The original traffic mark of the text data packet is "M3".

The hardware pre-processing module 312 may determine the QoS priority of each data packet of the first set of data packets based on a predetermined QoS priority rule. For example, the predetermined QoS priority rule may include that the priority of the video data packet is higher than the priority of the image data packet, that the priority of the image data packet is higher than the priority of the text data packet, that the priority of STA 120-2 is higher than the priority of STA 120-1, and that the priority of STA 120-1 is higher than the priority of STA 120-3. As a result, the hardware pre-processing module 312 may determine the order of priority from high to low as follows: the video data packets from the STA 120-2 (e.g., priority level 1), the image data packets from STA 120-2 (e.g., priority level 2), the text data packets from STA 120-2 (e.g., priority level 3), the video data packets from the STA 120-1 (e.g., priority level 4), the image data packets from STA 120-1 (e.g., priority level 5), the text data packets from STA 120-1 (e.g., priority level 6), the video data packets from the STA 120-3 (e.g., priority level 7), the image data packets from STA 120-3 (e.g., priority level 8), and the text data packets from STA 120-3 (e.g., priority level 9). The hardware pre-processing module 312 then assigns a hardware QoS traffic mark indicating the corresponding determined QoS priority to each data packet of the first set of data packets. In the example as shown in FIG. 4, the video data packet from the STA 120-2 is assigned the hardware QoS traffic mark "H1", the image data packets from the STA 120-2 are assigned the hardware QoS traffic mark "H2", the video data packet from the STA 120-1 is assigned the hardware QoS traffic mark "H4", and so on.

However, the hardware QoS traffic mark, such as "H1", "H2", "H4", etc., may not be recognized by the software QoS module 323. This may cause the software QoS module 323 modules to be unable to perform the QoS processing on the pro-processed first set of data packets. To solve this problem, the hardware pre-processing module 312 may be further configured to map the respective hardware QoS traffic mark of each data packet the first set of data packets into the respective software QoS traffic mark that can be recognizable by the software QoS module 323.

In one embodiment, the hardware pre-processing module 312 may perform the mapping based on a pre-stored mapping table indicating the correspondence between one or more software QoS traffic marks and one or more hardware QoS traffic marks.

FIG. 5 is a diagram illustrating an exemplary mapping table according to an embodiment of the present disclosure.

As shown in FIG. 5, the software QoS traffic marks "S1", "S2", . . . , "SN" corresponds to the hardware QoS traffic marks "H1", "H2", . . . , "HN". Note that the mapping table in FIG. 5 is only for illustration, the hardware and software traffic marks in practice may be complicated. The mapping table may be pre-stored in hardware pre-processing module 312 and software pre-processing module 322 and may also be updated over time.

In another embodiment, the hardware pre-processing module 312 may also perform the mapping based on a predetermined mathematical operation that maps one or more hardware QoS traffic marks to one or more software QoS traffic marks. For example, the hardware traffic marks corresponding to a certain software traffic mark may be obtained by performing a predetermined mathematical operation, such as modular operation, exponentiation operation, logarithm operation, square operation, etc., and a combination of these mathematical operations on the certain software traffic mark. In yet another embodiment, the hardware pre-processing module 312 may also perform the mapping based on a combination of the mapping table and the predetermined mathematical operation.

Referring back to FIG. 4, after mapping the respective hardware QoS traffic marks of the first set of data packets into respective software QoS traffic marks, the hardware pre-processing module 312 may forward the pre-processed first set of data packets with the respective software QoS traffic marks to the software QoS module 323.

Thus, in the event that the software QoS module 323 is the selected QoS module that is to be perform QoS processing on the pre-processed data packets, the hardware pre-processing module 312 may map the assigned the hardware QoS traffic marks to corresponding software QoS traffic marks to enable the pre-processed first set of data packets to be recognized by the software QoS module 323. Forwarding the pre-processed first set of data packets by hardware pre-processing module 312 to the software QoS module 323 may enable the pre-processed first set of data packets to be QoS processed together with the pre-processed second set of data packets, thereby improving the accuracy of the QoS processing.

Similar to the hardware receiving port 311, as shown in FIG. 4, the software receiving port 321 receives the second set of data packets from the STA 120-1, 120-2 and 120-3. The second set of data packets also includes a total of nine data packets including one video data packet and two image data packets received from STA 120-1, one video data packet and two text data packets received from STA 120-2, and one video data packet, one image data packet and one text data packet received from STA 120-3. Each data packet of the second set of data packets also has an original traffic mark "M1", "M2" or "M3" given by the corresponding STA.

Similar to the hardware pre-processing module 312, the software pre-processing module 322 may determine the QoS priority of each data packet of the second set of data packets based on the predetermined QoS priority rule. As a result, the software pre-processing module 322 may also determine the priority order from high to low as follows: the video data packets from the STA 120-2 (e.g., priority level 1), the image data packets from STA 120-2 (e.g., priority level 2), the text data packets from STA 120-2 (e.g., priority level 3), the video data packets from the STA 120-1 (e.g., priority level 4), the image data packets from STA 120-1 (e.g., priority level 5), the text data packets from STA 120-1 (e.g., priority level 6), the video data packets from the STA 120-3 (e.g., priority level 7), the image data packets from STA 120-3 (e.g., priority level 8), the text data packets from STA 120-3 (e.g., priority level 9). Then, the software pre-processing module 322 may assign each data packet of the second set of data packets a software QoS traffic mark indicating the determined QoS priority. As shown in FIG. 4, the video data packet from the STA 120-2 is assigned the software QoS traffic mark "S1", the text data packets from the STA 120-2 are assigned the software QoS traffic mark "S3", the video data packet from the STA 120-1 is assigned the software QoS traffic mark "S4", and so on.

After assigning the respective software QoS traffic mark to the respective data packet of the second set of data packets, the software pre-processing module 322 may forward the pre-processed second set of data packets with the respective software QoS traffic mark to the software QoS module 323.

Thus, in the event that the software QoS module 323 is the selected QoS module that is to be perform QoS processing on the pre-processed data packet, the software pre-processing module 322 can determine the QoS priority of each data packet of the second set of data packets and assign the software QoS traffic mark to each data packet of the second set of data packets to enable the second set of data packets to be ready for the subsequent QoS processing.

Referring to FIG. 4, the software QoS module 323 may perform QoS processing on the pre-processed first and second sets of data packets (and may further release the data packet that is a control-type data packet, as previously described). The QoS processing includes queuing each pre-processed data packet of the pre-processed first and second sets of data packets into a corresponding QoS processing queue based on the hardware QoS traffic mark of the pre-processed data packet. The software QoS module 323 may then perform traffic control on the data packets in QoS processing queues. As shown in FIG. 4, the software QoS module 323 may queue the data packets with soft QoS traffic mark "S1" into Queue 1, the data packets with soft QoS traffic mark "S2" into Queue 2, and so on. The QoS parameters (including parameters associated with bandwidth, delay, jitter, packet loss rate, etc.) required for different Queues may be different. For example, Queue 1 with the highest priority may be required to have large bandwidth, low delay, low jitter and low packet loss rate. Queue 2 with the second higher priority may be required to have large bandwidth, low delay, moderate jitter and moderate packet loss rate. The operations for traffic control may include an operation for controlling the bandwidth, delay, jitter and packet loss rate of each data packet in each queue to achieve a target bandwidth, target delay, target jitter and target packet loss rate. These operations are not the focus of the present disclosure and are therefore not described in detail here so as not to obscure the present disclosure.

In this way, AP 110 according to an embodiment of this disclosure may use the predetermined priority rule to determine the priorities of the data packets received from the hardware QoS path and the software QoS path and unify the QoS traffic marks of them. The unified QoS traffic marks of the data packets of the pro-processed first and second sets of data packets allow the pro-processed first and second sets of data packets to be QoS processed together by the software QoS module 323, thereby improving the accuracy of the QoS processing.

It should be noted that in FIG. 4 the first and second data packets are shown as uplink data packets received from the STAs, but this is only for convenience of explanation, and the first and second data packets shown in FIG. 4 may also be downlink data packets received from the network 130. In other words, the example data packet processing process shown in FIG. 4 may be used for both the uplink and downlink directions of AP 110.

Figure 6:
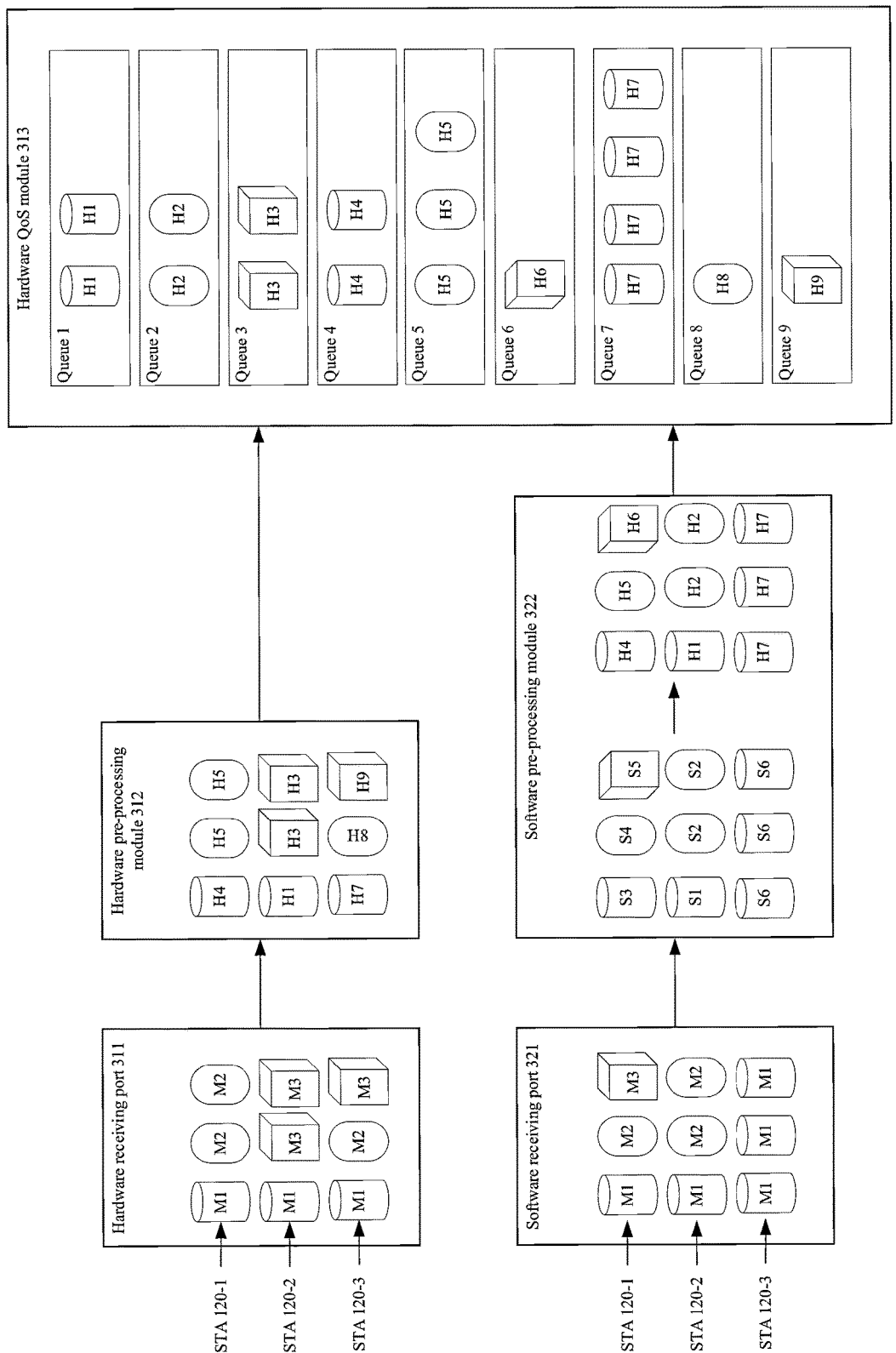
FIG. 6 is a diagram illustrating an exemplary processing flow of data packets according to another embodiment of the present disclosure.

FIG. 6 is a diagram illustrating an exemplary processing flow of data packets according to another embodiment of the present disclosure.

Referring to FIG. 6, the hardware receiving port 311 may receive a third set of data packets from the STA 120-1, 120-2 and 120-3. The third set of data packets includes a total of nine data packets including one video data packet and two image data packets received from STA 120-1, one video data packet and two text data packets received from STA 120-2, and one video data packet, one image data packet and one text data packet received from STA 120-3. The software receiving port 321 may receive a fourth set of data packets from the STA 120-1, 120-2 and 120-3. The fourth set of data packets includes a total of nine data packets including one video data packet, one image data packet and one text data packet received from STA 120-1, one video data packet and two image data packets received from STA 120-2, and three video data packets received from STA 120-3. Each data packet of the three and fourth sets of data packets has the original traffic mark "M1", "M2" or "M3" given by the corresponding STA.

The software pre-processing module 322 may determine the QoS priority of each data packet of the fourth set of data packets based on the predetermined QoS priority rule and assign each data packet of the fourth set of data packets a software QoS traffic mark indicating the determined QoS priority. For example, the predetermined QoS priority rule may include that the priority of a video data packet is higher than the priority of an image data packet, the priority of an image data packet is higher than the priority of a text data packets, the priority of STA 120-2 is higher than the priority of STA 120-1, and the priority of STA 120-1 is higher than the priority of STA 120-3. As a result, the video data packet from the STA 120-2 is assigned the software QoS traffic mark "S1", the image data packets from the STA 120-2 are assigned the software QoS traffic mark "S2", the video data packet from the STA 120-1 is assigned the software QoS traffic mark "S3", and so on. Then, the software pre-processing module 322 may further map respective software QoS traffic mark of each data packet of the fourth set of data packets to respective hardware QoS traffic mark based on the mapping table, such as the table in FIG. 5, indicating the correspondence between one or more software QoS traffic marks and one or more hardware QoS traffic marks and/or based on a predetermined mathematical operation that maps the one or more software QoS traffic marks to the one or more hardware QoS traffic marks.

Referring to FIG. 6, after mapping the respective software QoS traffic mark of the respective data packet the fourth set of data packets into the respective hardware QoS traffic mark, the software pre-processing module 322 may forward the pre-processed fourth set of data packets with the respective hardware QoS traffic mark to the hardware QoS module 313.

Thus, in the event that the hardware QoS module 313 is the selected QoS module that is to be perform QoS processing on the pre-processed data packet, the software pre-processing module 322 may map the assigned the software QoS traffic marks to corresponding hardware QoS traffic marks to enable the pre-processed fourth set of data packets to be recognized by the hardware QoS module 313. Forwarding the pre-processed fourth set of data packets by the software pre-processing module 322 to the hardware QoS module 313 may enable the pre-processed fourth set of data packets to be QoS processed together with the pre-processed third set of data packets, thereby improving the accuracy of the QoS processing.

As shown in FIG. 6, the hardware receiving port 311 may receive the third set of data packets from the STA 120-1, 120-2 and 120-3. The third set of data packets also includes a total of nine data packets including one video data packet and two image data packets received from STA 120-1, one video data packet and two text data packets received from STA 120-2, and one video data packet, one image data packet and one text data packet received from STA 120-3. Each data packet of the third set of data packets also has an original traffic mark "M1", "M2" or "M3" given by the corresponding STA.

The hardware pre-processing module 312 may also determine the QoS priority of each data packet of the third set of data packets based on the predetermined QoS priority rule. As shown in FIG. 6, the hardware pre-processing module 312 may assign each data packet of the third set of data packets a hardware QoS traffic mark indicating the determined QoS priority. As shown in FIG. 6, the video data packet from the STA 120-2 is assigned the hardware QoS traffic mark "H1", the text data packets from the STA 120-2 are assigned the hardware QoS traffic mark "H3", the video data packet from the STA 120-1 is assigned the hardware QoS traffic mark "H4", and so on.

Thus, in the event that the hardware QoS module 313 is the selected QoS module that is to be perform QoS processing on the pre-processed data packet, the hardware pre-processing module 312 can determine the QoS priority of each data packet of the third set of data packets and assign the hardware QoS traffic mark to each data packet of the third set of data packets to enable the third set of data packets to be ready for the subsequent QOS processing.

After assigning each data packet of the third set of data packets a hardware QoS traffic mark, the hardware pre-processing module 312 may forward each pre-processed data packet of the pre-processed third set of data packets with respective hardware QoS traffic mark to the hardware QoS module 313.

Referring to FIG. 6, the hardware QoS module 313 may perform QoS processing on the pre-processed third and fourth sets of data packets (and may further release a data packet that is a control-type data packet, as previously described). The QoS processing includes queuing each data packet in the third and fourth sets of data packets to a corresponding QoS processing queue for traffic control based on the hardware QoS traffic mark of the data packet. As shown in FIG. 6, the hardware QoS module 313 may queue the pre-processed data packets with hardware QoS traffic marks "H1" into Queue 1, the pre-processed data packets with hardware QoS traffic marks "H2" into Queue 2, and so on. The hardware QoS module 313 may then perform operations for traffic control on the pre-processed data packets in each QoS processing queue.

In this way, AP 110 according to an embodiment of this disclosure may use the the predetermined priority rule to determine the priorities of the data packets received from the hardware QoS path and the software QoS path and unify the QoS traffic marks of them. The unified QoS traffic marks of the data packets of the pro-processed third and fourth sets of data packets enable the pro-processed third and fourth sets of data packets to be QoS processed together by the hardware QoS module 313, thereby improving the accuracy of the QoS processing.

It should be noted that in FIG. 6 the data packets of the third and fourth sets of data packets are shown as uplink data packets received from the STAs 120-1, 120-2 and 120-3, but this is only for the convenience of explanation. The data packets of the third and fourth sets of data packets may also be downlink data packets received from network 130. In other words, the example data packet processing process in FIG. 6 may be used for both the uplink and downlink directions of AP 110.

Figure 7:
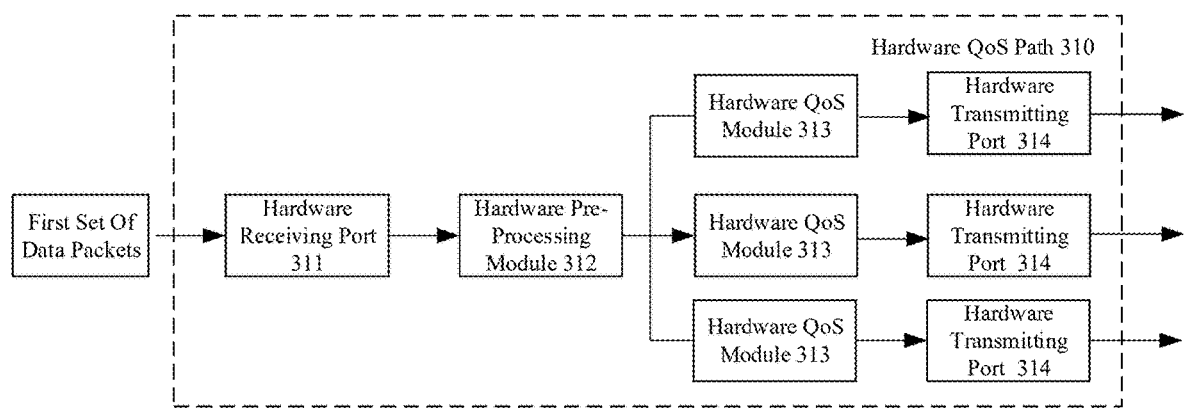
FIG. 7 is a diagram illustrating an exemplary application scenario in which the hardware QoS module cannot be used in the downlink direction of the AP according to an embodiment of the present disclosure.

FIG. 7 is a diagram illustrating an exemplary application scenario in which the hardware QoS module cannot be used in the downlink direction of AP according to an embodiment of the present disclosure.

As is known, the commercially available system on chip (SoC) for an AP may generally have a hardware QoS module at each WAN and LAN port. An AP may generally be designed to have one WAN port and multiple LAN ports. For this type of AP, there are multiple hardware QoS modules for multiple LAN ports, respectively. In this case, when the selected QoS module is the hardware QoS module and the hardware QoS path is used in the downlink direction (i.e., the data packets received by the hardware receiving port and the second data packets received by the software receiving port are downlink packets to be relayed to one or more STAs), the pre-processed data packets may not be aggregated in one of the multiple hardware QoS modules but instead may be distributed to each of the multiple hardware QoS modules. Considering the example in FIG. 7, the data packets of the first set of data packets are downlink data packets to be relayed to STAs 120-1, 120-2 and 120-3. The pre-processed first set of data packets may be distributed to three hardware QoS modules 313 corresponding to three hardware transmitting ports 314, respectively. This may also cause a low accuracy of the QoS processing.

To avoid this undesirable situation, the selected QoS module may be limited as the software QoS module 323 when the first set of data packets and the second set of data packets are downlink data packets and be limited as the hardware QoS module 313 when the first set of data packets and the second set of data packets are uplink data packets. In other words, the example data packet processing processes shown in FIGS. 3A and 4 are used for the downlink direction of AP 110 and the example data packet processing processes shown in FIGS. 3B and 6 are used for the uplink direction of AP 110. This is especially beneficial for an AP equipped with a hardware QoS module for each of multiple LAN ports, as it can avoid the low QoS accuracy caused by the need to distribute downlink data packets to multiple hardware QOS modules.

Figure 8:
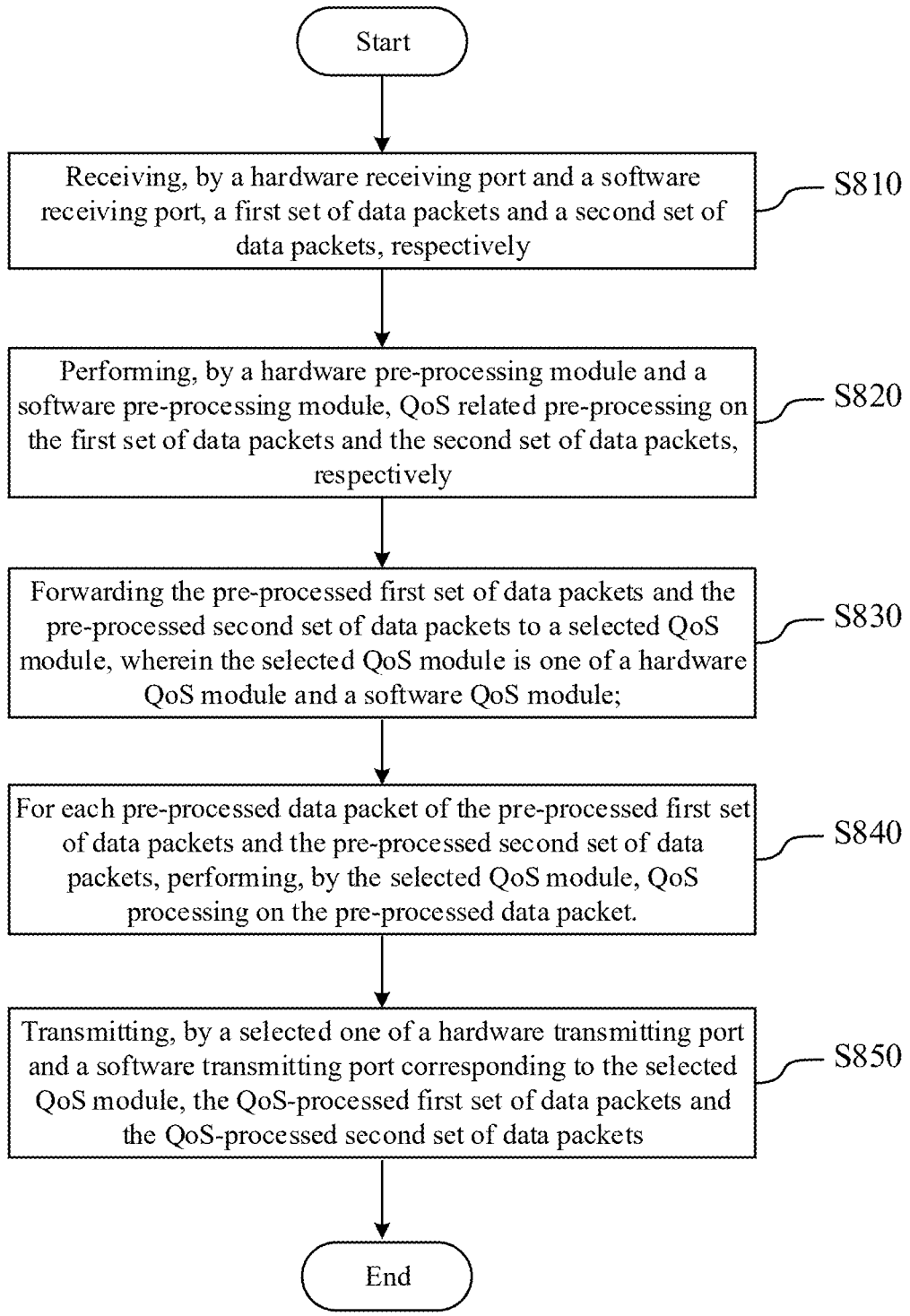
FIG. 8 is a flowchart illustrating the method for data transmission according to an embodiment of the present disclosure.

FIG. 8 is a schematic flowchart illustrating the method for data transmission according to an embodiment of the present disclosure. The method may be implemented by AP 110.

Referring to FIG. 8, the method 800 includes steps S810 to S850.

In step S810, the hardware receiving port (e.g., hardware receiving port 311) and a software receiving port (e.g., software receiving port 321) may receive a first set of data packets and a second set of data packets, respectively. In step S820, the hardware pre-processing module (e.g., hardware pre-processing module 312) and the software pre-processing module (e.g., software pre-processing module 322) may perform QoS related pre-processing on the first set of data packets and the second set of data packets, respectively. In step S830, the pre-processed first set of data packets and the pre-processed second set of data packets are aggregated in a selected QoS module. The selected QoS module is one of a hardware QoS module (e.g., hardware QoS module 313) and a software QoS module (e.g., software QoS module 323). In one example, as previously described in FIGS. 3A and 3B, the selected QoS module may be selected based on the utilization of the CPU of AP 110. In another example, as previously described in FIG. 7, the selected QoS module may be limited as the software QoS module 323 when the first set of data packets and the second set of data packets are downlink data and be limited as the hardware QoS module 313 when the first set of data packets and the second set of data packets are uplink data packets.

In step S840, as previously described, the QoS processing on the pre-processed data packet is performed based on the type of the pre-processed data packet meeting a predetermined condition. For example, the predetermined condition may include that the pre-processed data packet is not a control-type data packet.

Preferably, As previously described, the predetermined condition comprises that the pre-processed data packet is not a control-type data packet. That is, the selected QoS module directly releases the pre-processed data packet and does not perform QoS processing on it if the data packet is a control-type data packet.

In step S850, the QoS-processed first set of data packets and the QoS-processed second set of data packets may be transmitted by the selected one of the hardware transmitting port (e.g., hardware transmitting port 314) and the software transmitting port (e.g., software transmitting port 324) corresponding to the selected QoS module. For example, the QoS-processed first and second sets of data packets are transmitted by the hardware transmitting port 314 when the QoS processing on the pre-processed first and second sets of data packets is performed by the hardware QoS module 313. For another example, the QoS-processed first and second sets of data packets are transmitted by the software transmitting port 324 when the QoS processing on the pre-processed first and second sets of data packets is performed by the software QoS module 323.

Figure 9:
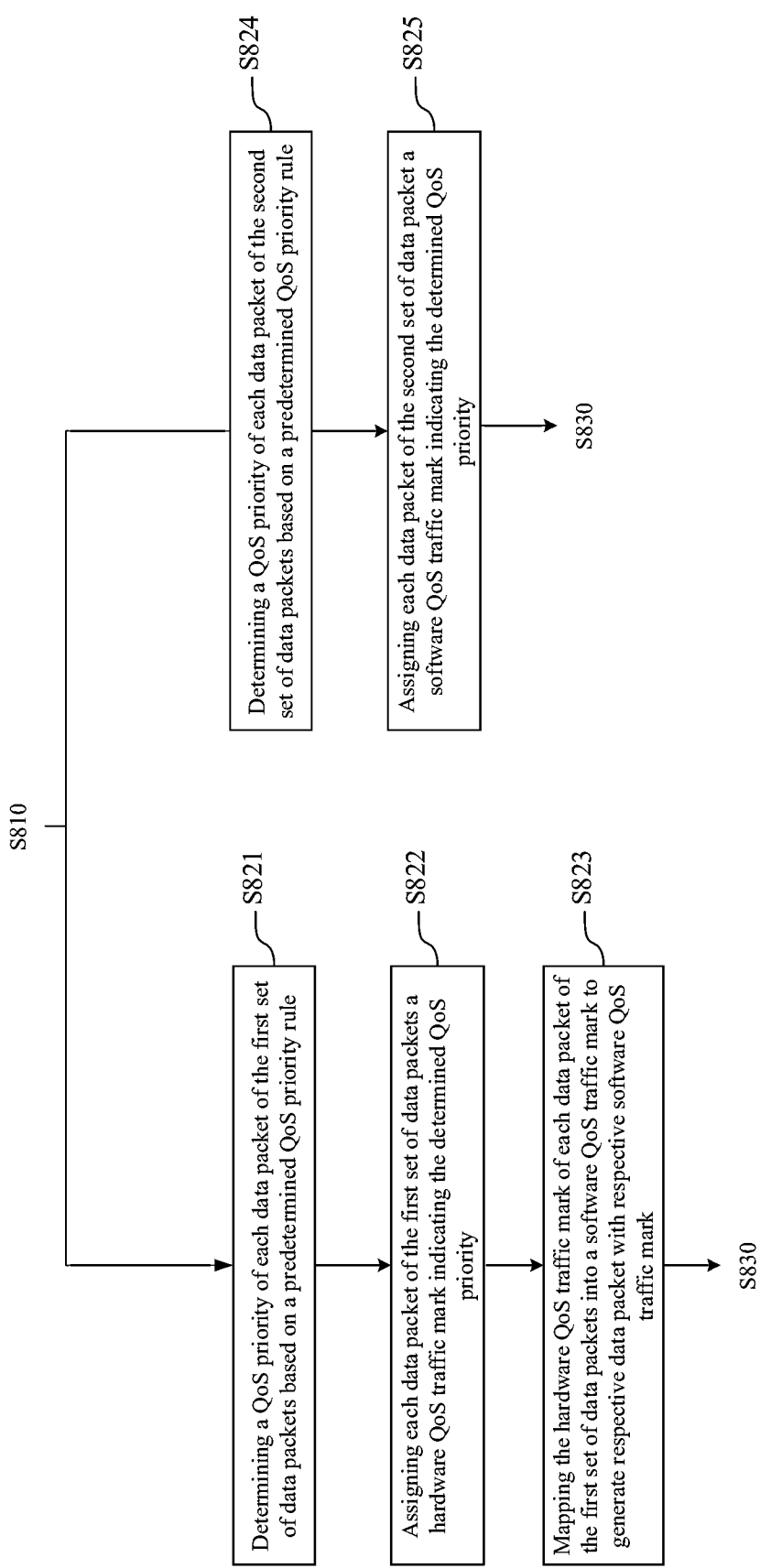
FIG. 9 is a flowchart illustrating the sub-steps of step S820 of the method for data transmission according to an embodiment of the present disclosure.

FIG. 9 is a flowchart illustrating the sub-steps of step S820 of the method for data transmission according to an embodiment of the present disclosure.

Given the selected QoS module in step S810 is the software QoS module 323, step S820 may include sub-steps S821 to S823 performed by a hardware pre-processing module (e.g., hardware pre-processing module 312) and sub-steps S824 to S825 performed by a software pre-processing module (e.g., software pre-processing module 322).

In sub-step S821, the hardware pre-processing module may determine a QoS priority of each data packet of the first set of data packets based on a predetermined QoS priority rule. In sub-step S822, the hardware pre-processing module may assign each data packet of the first set of data packets a hardware QoS traffic mark indicating the determined QoS priority. In the sub-step S823, the hardware pre-processing module may map the hardware QoS traffic mark assigned for each data packet of the first set of data packets into respective software QoS traffic mark based on a pre-stored mapping table, such as the mapping table in FIG. 5, indicating a correspondence between one or more software QoS traffic marks and one or more hardware QoS traffic marks and/or based on a predetermined mathematical operation that maps the one or more software QoS traffic marks to the one or more hardware QoS traffic marks.

In sub-step S824, the software pre-processing module may determine a QoS priority of each data packet of the second set of data packets based on a predetermined QoS priority rule. In sub-step S825, the software pre-processing module may assign each data packet of the second set of data packets a software QoS traffic mark indicating the determined QoS priority.

After the sub-steps S823 and S825, the method 800 proceeds to step S830.

Figure 10:
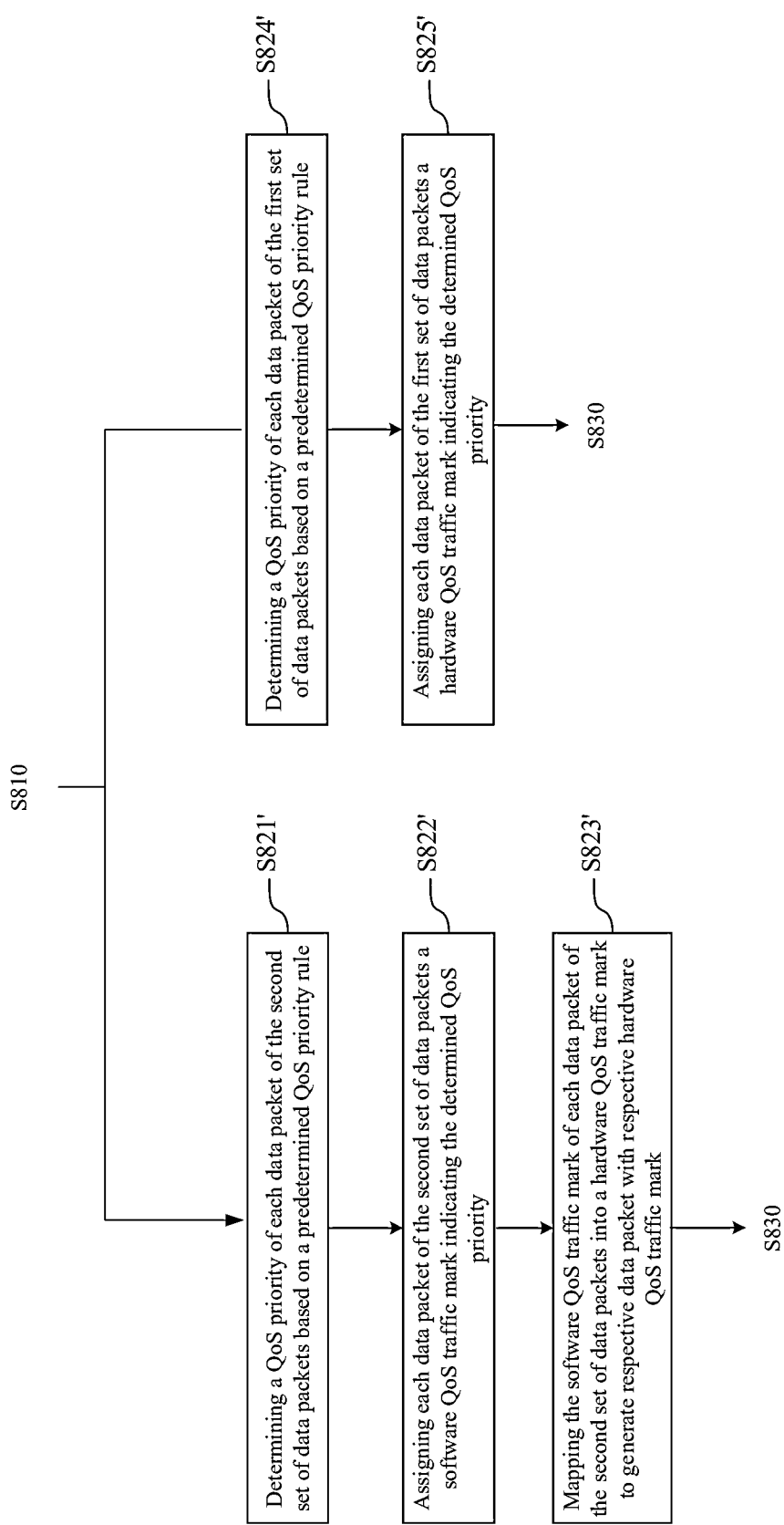
FIG. 10 is a flowchart illustrating the sub-steps of step S820 of the method for data transmission according to another embodiment of the present disclosure.

FIG. 10 is a flowchart illustrating the sub-steps of step S820 of the method for data transmission according to another embodiment of the present disclosure.

Given the selected QoS module in step S810 is the hardware QoS module 313, the step S820 may include sub-steps S821' to S823' performed by a software pre-processing module (e.g., software pre-processing module 322) and sub-steps S824' to S825' performed by a hardware pre-processing module (e.g., hardware pre-processing module 312).

In sub-step S821', the software pre-processing module may determine a QoS priority of each data packet of the second set of data packets based on a predetermined QoS priority rule. In sub-step S822', the software pre-processing module may assign each data packet of the second set of data packets a software QoS traffic mark indicating the determined QoS priority. In the sub-step S823, the software pre-processing module may map the software QoS traffic mark of each data packet of the second set of data packets into respective hardware QoS traffic mark based on a pre-stored mapping table, such as the mapping table in FIG. 5, indicating a correspondence between one or more hardware QoS traffic marks and one or more software QoS traffic marks and/or based on a predetermined mathematical operation that maps the one or more hardware QoS traffic marks to the one or more software QoS traffic marks.

In sub-step S824', the hardware pre-processing module may determine a QoS priority of each data packet of the first set of data packets based on a predetermined QoS priority rule. In sub-step S825', the hardware pre-processing module may assign each data packet of the first set of data packets a hardware QoS traffic mark indicating the determined QoS priority.

After the sub-steps S823' and S825', the method 800 proceeds to step S830.

The process of implementing method 800 by the AP 110 has been described in connection with FIGS. 3 to 6 and details are omitted herein for conciseness.

As such, the method for data transmission according to an embodiment of the present disclosure allows the pre-processed first set of data packets and the pre-processed second set of data packets to be QoS processed together while allowing the first set of data packets and the second set of data packets to be received and pre-processed separately. This can reduce the overhead of the CPU resources of the AP 110 and improve the accuracy of the QoS processing.

Figure 11:
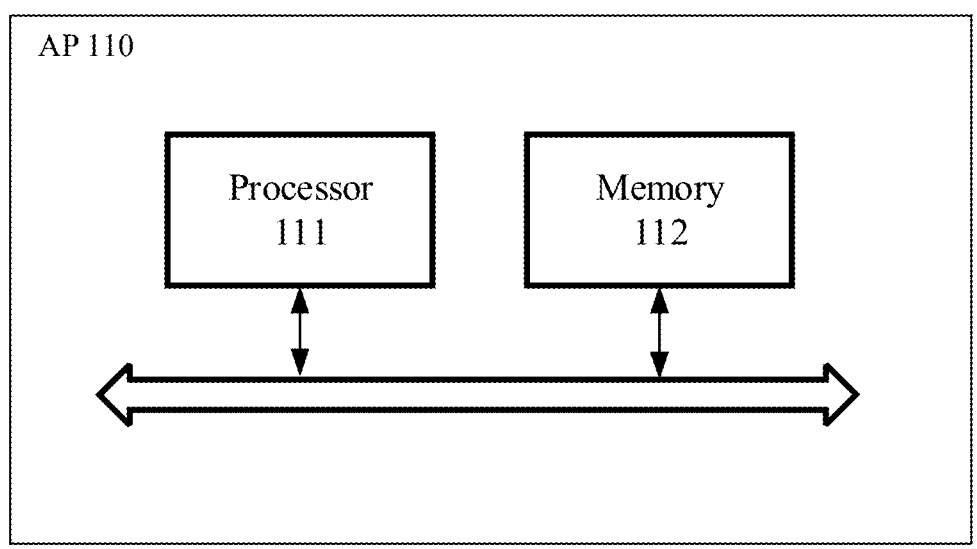
FIG. 11 is an exemplary block diagram illustrating the AP according to an embodiment of the present disclosure.

FIG. 11 is an exemplary block diagram illustrating the AP according to an embodiment of the present disclosure. It should be noted that the AP depicted in FIG. 11 can be used to perform method 800 as described above.

As shown in FIG. 11, AP 110 may comprise a processor 111 and a memory 112. The processor 111 may be coupled with the memory 112 via a communication bus and may be configured to perform the method 800 discussed above.

Examples of processor 111 may comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout the present disclosure.

The processor 111 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 112.

The memory 112 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

In addition, according to another embodiment of the present disclosure, a computer program product for controlling data transmission is disclosed. As an example, the computer program product includes a computer-readable medium having program instructions embodied therewith, and the program instructions are executable by a processor. When executed, the program instructions cause the processor to perform one or more procedures described above. The present disclosure may be a system, a method, and/or a computer program product at any possible technical detail level of integration. The computer program product may include a computer-readable storage medium having computer-readable program instructions thereon for causing a processor to carry out aspects of the present disclosure.

The present disclosure may be a system, a method, and/or a computer program product at any possible technical detail level of integration. The computer program product may include a computer-readable storage medium having computer-readable program instructions thereon for causing a processor to carry out aspects of the present disclosure.

An expression such as "according to", "based on", "dependent on", and so on as used in the disclosure does not mean "according only to", "based only on", or "dependent only on" unless it is explicitly otherwise stated. In other words, such expression generally means "according at least to", "based at least on", or "dependent at least on" in the disclosure.

The term "determining" used in the disclosure can include various operations. For example, regarding "determining", calculating, computing, processing, deriving, investigating, looking up (e.g., looking up in tables, databases, or other data structures), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for data transmission performed by an access point (AP), comprising:
    receiving, by a hardware receiving port and a software receiving port, a first set of data packets and a second set of data packets, respectively;
    performing, by a hardware pre-processing module and a software pre-processing module, Quality of Service (QoS) related pre-processing on the first set of data packets and the second set of data packets, respectively;
    wherein a selected QoS module is a hardware QoS module, and wherein the method further comprising:
        forwarding, by the hardware pre-processing module, the pre-processed first set of data packets to the hardware QoS module;
        forwarding, by the software pre-processing module, the pre-processed second set of data packets to the hardware QoS module; and
        for each pre-processed data packet of the pre-processed first set of data packets and the pre-processed second set of data packets, performing, by the hardware QoS module, QoS processing on the pre-processed data packet, or
    wherein the selected QoS module is a software QoS module, and wherein the method further comprising:
        forwarding, by the hardware pre-processing module, the pre-processed first set of data packets to the software QoS module;
        forwarding, by the software pre-processing module, the pre-processed second set of data packets to the software QoS module; and
        for each pre-processed data packet of the pre-processed first set of data packets and the pre-processed second set of data packets, performing, by the software QoS module, QoS processing on the pre-processed data packet.

2. The method of claim 1, wherein the QoS processing on the pre-processed data packet is performed based on the type of the pre-processed data packet meeting a predetermined condition, wherein the predetermined condition comprises: the pre-processed data packet is not a control-type data packet.

3. The method of claim 1, wherein
    the selected QoS module is the hardware QoS module;
    wherein the pre-processing performed on the second set of data packets by the software pre-processing module comprises:
        determining a QoS priority of each data packet of the second set of data packets based on a predetermined QoS priority rule;
        assigning each data packet of the second set of data packets a software QoS traffic mark indicating the determined QoS priority; and
        mapping the software QoS traffic mark of each data packet of the second set of data packets into a hardware QoS traffic mark to generate respective data packet with respective hardware QoS traffic mark; and
    wherein forwarding, by the software pre-processing module, the pre-processed second set of data packets to the hardware QoS module comprises forwarding each pre-processed data packet of the pre-processed second set of data packets with the hardware QoS traffic mark to the hardware QoS module.

4. The method of claim 3, wherein the mapping is based on a pre-stored mapping table indicating a correspondence between one or more software QoS traffic marks and one or more hardware QoS traffic marks and/or based on a predetermined mathematical operation that maps the one or more software QoS traffic marks to the one or more hardware QoS traffic marks.

5. The method of claim 3, wherein the pre-processing performed on the first set of data packets by the hardware pre-processing module comprises:
    determining a QoS priority of each data packet of the first set of data packets based on a predetermined QoS priority rule; and
    assigning each data packet of the first set of data packets a hardware QoS traffic mark indicating the determined QoS priority.

6. The method of claim 5, wherein the QoS processing comprises:
    queuing each pre-processed data packet of the pre-processed first set of data packets and the pre-processed second set of data packets to a corresponding QoS processing queue for traffic control based on the hardware QoS traffic mark.

7. The method according to claim 3, wherein the first set of data packets and the second set of data packets are uplink packets from a station.

8. The method of claim 1, wherein
    the selected QoS module is a software QoS module;
    wherein the pre-processing performed on the first set of data packets by the hardware pre-processing module comprises:
        determining a QoS priority of each data packet of the first set of data packets based on a predetermined QoS priority rule;
        assigning each data packet of the first set of data packets a hardware QoS traffic mark indicating the determined QoS priority; and
        mapping the hardware QoS traffic mark of each data packet of the first set of data packets into a software QoS traffic mark to generate respective data packet with respective software QoS traffic mark; and wherein forwarding, by the hardware pre-processing module, the pre-processed first set of data packets to the software QoS module comprises forwarding each pre-processed data packet of the pre-processed first set of data packets with the software QoS traffic mark to the software QoS module.

9. The method of claim 8, wherein the mapping is based on a pre-stored mapping table indicating the correspondence between one or more software QoS traffic marks and one or more hardware QoS traffic marks and/or based on a predetermined mathematical operation that maps the one or more hardware QoS traffic marks to the one nor more software QoS traffic marks.

10. The method of claim 8, wherein the pre-processing performed on the second set of data packets by the software pre-processing module comprises:

determining a QoS priority of each data packet of the second set of data packets based on a predetermined QoS priority rule; and assigning each data packet of the second set of data packets a software QoS traffic mark indicating the determined QoS priority.

11. The method of claim 10, wherein the QoS processing comprises:

queuing each pre-processed data packet of the pre-processed first set of data packets and the pre-processed second set of data packets to a corresponding QoS processing queue for traffic control based on the hardware QoS traffic mark.

12. The method according to claim 8, wherein the first set of data packets and the second set of data packets are downlink packets to be transmitted to a station.

13. The method of claim 1, further comprising:

transmitting, by a selected one of a hardware transmitting port and a software transmitting port corresponding to the selected QoS module, the QoS-processed first set of data packets and the QoS-processed second set of data packets.

14. An access point (AP), comprising:

a hardware receiving port, configured for receiving a first set of data packets;

a software receiving port, configured for receiving a second set of data packets;

a hardware pre-processing module, configured for performing Quality of Service (QoS) related pre-processing on the first set of data packets and forwarding the pre-processed first set of data packets to a selected QoS module;

a software pre-processing module, configured for performing QoS related pre-processing on the second set of data packets and forwarding the pre-processed second set of data packets to the selected QoS module;

wherein a selected QoS module is a hardware QoS module:

the hardware pre-processing module is configured for forwarding the pre-processed first set of data packets to the hardware QoS module;

the software pre-processing module is configured for forwarding the pre-processed second set of data packets to the hardware QoS module; and for each pre-processed data packet of the pre-processed first set of data packets and the pre-processed second set of data packets, the hardware QoS module is configured for performing QoS processing on the pre-processed data packet, or wherein the selected QoS module is the software QoS module:

the hardware pre-processing module is configured for forwarding the pre-processed first set of data packets to the software QoS module;

the software pre-processing module is configured for forwarding the pre-processed second set of data packets to the software QoS module; and for each pre-processed data packet of the pre-processed first set of data packets and the pre-processed second set of data packets, the software QoS module is configured for performing QoS processing on the pre-processed data packet.

15. The access point of claim 14, wherein the selected QoS module is configured for performing QoS processing on the pre-processed data packet based on the type of the pre-processed data packet meeting a predetermined condition, and wherein the predetermined condition comprises:

the pre-processed data packet is not a control-type data packet.

16. The access point of claim 14, wherein the selected QoS module is the hardware QoS module;

wherein the software pre-processing module is further configured for performing pre-processing on the second set of data packets by:

determining a QoS priority of each data packet of the second set of data packets based on a predetermined QoS priority rule, assigning each data packet of the second set of data packet a software QoS traffic mark indicating the determined QoS priority, and mapping the software QoS traffic mark of each data packet of the second set of data packets into a hardware QoS traffic mark to generate respective data packet with respective hardware QoS traffic mark, and wherein the software pre-processing module is further configured for forwarding each pre-processed data packet of the pre-processed second set of data packets with the hardware QoS traffic mark to the hardware QoS module.

17. The access point of claim 16, wherein the hardware pre-processing module is configured for performing the pre-processing on the first set of data packets by:

determining a QoS priority of each data packet of the first set of data packets based on a predetermined QoS priority rule, and assigning each data packet of the first set of data packets a hardware QoS traffic mark indicating the determined QoS priority; and wherein the hardware QoS module is further configured for queuing each pre-processed data packet of the first set of data packets and the second set of data packets to a corresponding QoS processing queue for traffic control based on the hardware QoS traffic mark.

18. The access point of claim 14 wherein the selected QoS module is a software QoS module;

wherein the hardware pre-processing module is further configured for performing the pre-processing on the first set of data packets by:

determining a QoS priority of each data packet of the first set of data packets based on a predetermined QoS priority rule, assigning each data packet of the first set of data packets a hardware QoS traffic mark indicating the determined QoS priority, and mapping the hardware QoS traffic mark of each data packet of the first set of data packets into a software QoS traffic mark, and wherein the hardware pre-processing module is further configured for forwarding each pre-processed data packet of the pre-processed first set of data packets with the software QoS traffic mark to the software QoS module.

19. The access point of claim 18, wherein the software pre-processing module is configured for performing the pre-processing on each data packet of the second set of data packets by:

determining a QoS priority of each data packet of the second set of data packets based on a predetermined QoS priority rule, and assigning each data packet of the second set of data packets a software QoS traffic mark indicating the determined QoS priority, and wherein the software QoS module is configured for queuing each pre-processed data packet of the pre-processed first set of data packets and the pre-processed second set of data packets to a corresponding QoS processing queue for traffic control based on the software QoS traffic mark.

20. A computer program product, including computer-readable medium storing instructions thereon, when executed by a processor of an access point (AP) causes the processor to perform operations of:

controlling reception of a first set of data packets and a second set of data packets by a hardware receiving port and a software receiving port of the AP, respectively;

controlling performance of Quality of Service (QoS) related pre-processing on the first set of data packets and the second set of data packets by a hardware pre-processing module and a software pre-processing module of the AP, respectively;

wherein a selected QoS module is a hardware QoS module, the instructions further cause the processor to perform operations of:

controlling forwarding of the pre-processed first set of data packets to the hardware QoS module by the hardware pre-processing module;

controlling forwarding of the pre-processed second set of data packets to the hardware QoS module by the software pre-processing module; and controlling performance of QoS processing on each pre-processed data packet of the pre-processed first set of data packets and the pre-processed second set of data packets by hardware QoS module, or wherein the selected QoS module is the software QoS module, the instructions further cause the processor to perform operations of:

controlling forwarding of the pre-processed first set of data packets to the software QoS module by the hardware pre-processing module;

controlling forwarding of the pre-processed second set of data packets to the software QoS module by the software pre-processing module; and controlling performance of QoS processing on each pre-processed data packet of the pre-processed first set of data packets and the pre-processed second set of data packets by the software QoS module.

\* \* \* \* \*